June 16, 1936.     A. W. FOWLER     2,044,286
CLOCK
Filed Oct. 12, 1931     2 Sheets-Sheet 2

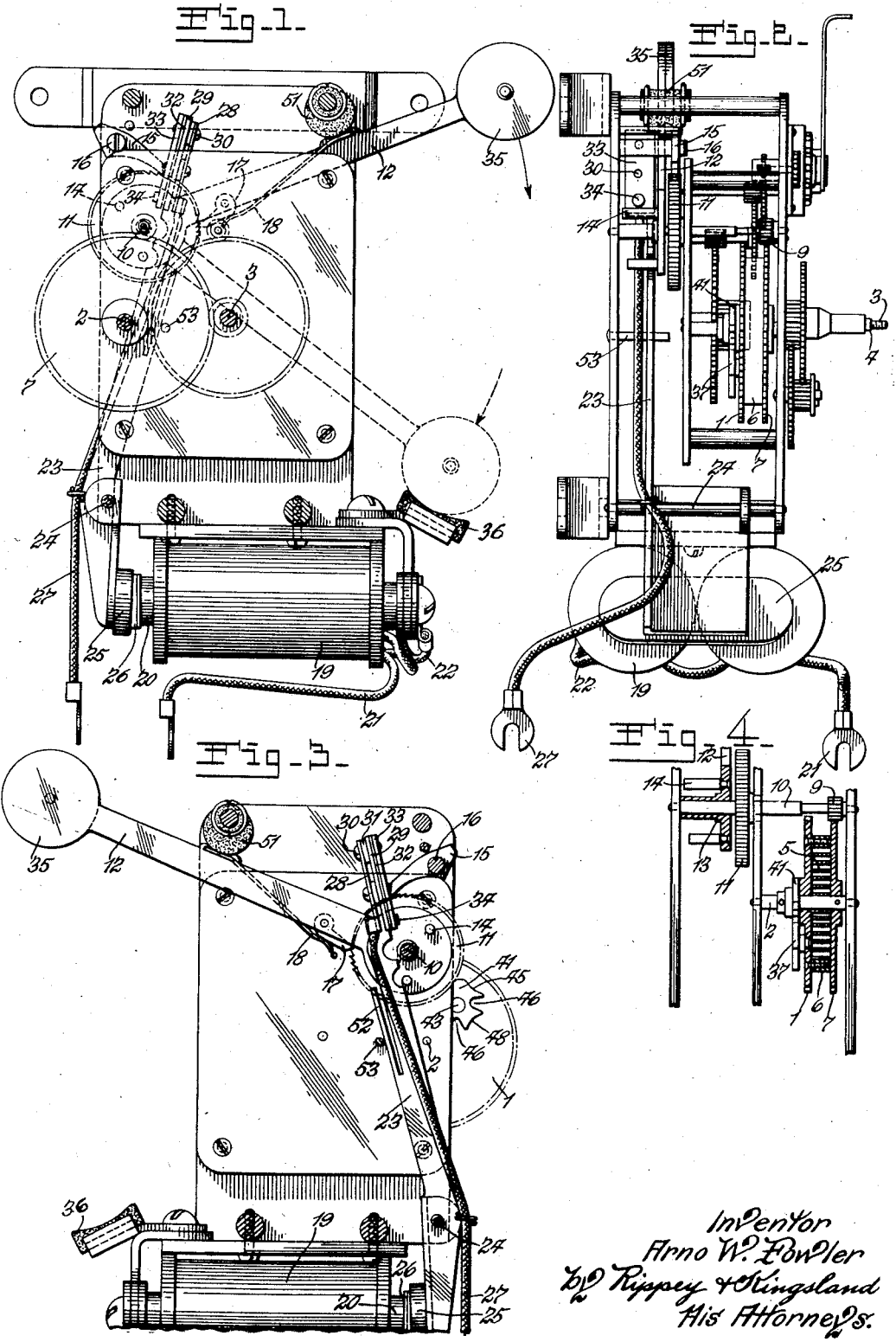

Inventor
Arno W. Fowler
by Rippey & Kingsland
His Attorneys.

Patented June 16, 1936

2,044,286

UNITED STATES PATENT OFFICE 2,044,286

CLOCK

Arno W. Fowler, Highland, Ill.

Application October 12, 1931, Serial No. 568,280

3 Claims. (Cl. 185—40)

This invention relates to clocks.

Objects of the invention are to provide an improved clock having a main spring for operating the clock mechanism, in combination with a shaft attached to one end of said spring, gearing for rotating said shaft in a direction to wind said spring, a device for operating said gearing to wind said spring, and an electric circuit adapted to cooperate with said device to operate said device whenever said spring is partly unwound below a predetermined maximum of tension. In the present embodiment of the invention, the device that actuates the gearing to wind the spring is mounted on a pivot for swinging movements and is in cooperation with a circuit closer, so that when the spring is completely wound and said device is supported out of a predetermined position, the circuit is kept open and said device will not be operated. But when said pivoted device moves to a predetermined position, it effects a closing of the circuit and energizes an actuator for moving said device from said position, causing said device to operate said gearing to wind and increase the tension of the spring.

Another object of the invention is to provide an improved clock embodying the mechanism of the character mentioned provided with means for preventing the spring from becoming overwound.

Other objects will appear from the following description, reference being made to the accompanying drawings, in which—

Fig. 1 is a view of the clock mechanism having the front frame plate removed and several of the arbors and shafts shown in section.

Fig. 2 is a side elevation of the clock.

Fig. 3 is a view from the rear, the rear frame plate of the clock being removed and several of the shafts being shown in section, and the device that operates the gearing being in position to operate said gearing to wind the spring.

Fig. 4 is a detail sectional view showing the gearing for winding the clock spring and a part of the actuating device for said gearing.

Figure 5:
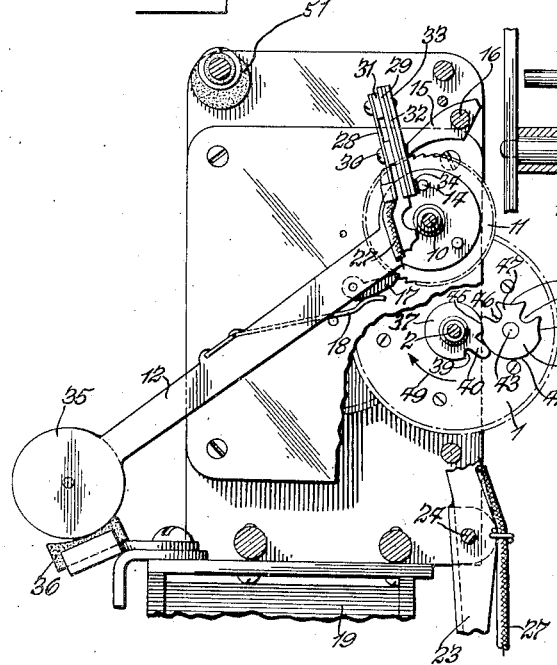
Fig. 5 is a view similar to Fig. 4 with other parts removed and showing part of the clock mechanism in the position it occupies when the spring is run down or unwound.

The time indicating mechanism of the clock is operated by a gear wheel 1 mounted for rotation on and about a rotary shaft 2. The usual hands of the clock (not shown) are mounted on spindles 3 and 4 rotated at different speeds by familiar trains of gearing operated by the gear wheel 1. A spring 5 has one end attached to a drum 6 rigid with the gear wheel 1 and the opposite end attached to the shaft 2. The clock, of course, includes the usual escapements and control devices (not shown) for rotating the spindles 3 and 4 at proper speed by the slow rotation of the gear 1 by the spring 5. The spring 5 is wound by rotating the shaft 2 in the proper direction relative to the gear 1 and unwinds to rotate the gear 1 while the shaft 2 remains stationary.

The present invention comprises mechanism for winding and tensioning the spring 5 and maintaining said spring 5 at approximately uniform tension at all times. Further, the invention comprises means for maintaining an approximately uniform storage of power and energy in the spring 5, so that in event of interruption of the frequent operation of the winding mechanism, said spring 5 will continue to operate the clock for a considerable period of time. This prevents the clock from stopping in event of the interruption of the continuity of electric energy.

A gear wheel 7 is attached to the shaft 2 by a fastener 8 and is in constant mesh with a pinion 9 attached to a rotary shaft 10. A ratchet gear 11 is attached to the shaft 10 adjacent to a lever 12 having a hub 13 pivoted on said shaft. A pin 14 attached to the lever 12 projects therefrom parallel with the shaft 10. A pawl 15 pivoted on a support 16 engages the peripheral teeth on the ratchet wheel 11 and prevents said ratchet wheel from being turned in a reverse direction by the power and energy of the spring 5 exerted through the shaft 2, the gear 7, the spindle 9, and the shaft 10. A pawl 17 pivotally supported by the lever 12 is held in engagement with the peripheral teeth of the ratchet wheel 11 by a spring 18. Thus, the lever 12 and the pawl 17 constitute means for rotating the ratchet wheel 11 and thereby the shaft 10, the pinion 9, the gear wheel 7 and the shaft 2 effectively to wind the spring 5.

An electro-magnet device 19 is mounted in connection with the clock and has cores 20 which are energized when the electric circuit through the electro-magnet is closed. An electric circuit wire 21 is connected to one end of the electro-magnet

19 and said magnet is electrically connected with the frame of the clock by a wire 22.

A metallic lever 23 is pivotally supported by a pivot 24 and at its lower end supports a metallic member 25. A metallic spring 26 is attached to the side of the metallic member 25 that is toward the cores or armatures 20 and said spring is effective when the electric circuit is broken to impart an impulse to the lower end of the lever 23 to initiate a movement to separate the member 25 from the armatures 20.

The other wire 27 of the electric circuit is connected with a metallic terminal fastener plate 28 attached to and insulated from the upper end of the lever 23. The upper end of the lever 23 has a laterally bent portion 29. Metallic screws 30 pass through the metallic terminal plate 28 through insulation plugs 31 through an insulation plate 32 and are engaged with a metallic plate 33. Thus, the metallic plate 28 is in electrical communication with the plate 33 through the screws 30, but is out of electrical communication with the lever 23 and the part 29 of said lever.

Figure 8:
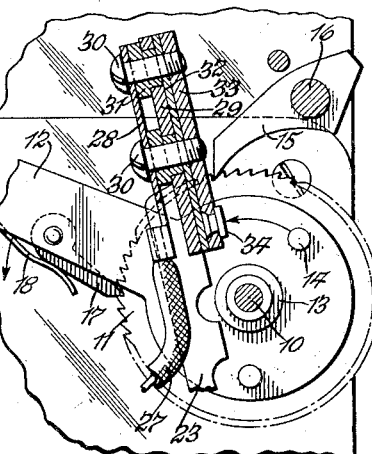
Fig. 8 is a sectional view of a part of the circuit closer mechanism illustrating the devices by which the gear actuating device of the spring winding mechanism controls the electric circuit.

A metallic contact member 34 (Figs. 3, 5 and 8) is attached to the metallic plate 33 and thus in electrical communication with the metallic terminal plate 28 and is out of electrical communication with the lever 23. This is true because the insulation plugs 31 support the screws 30 out of electrical communication with the part 29 of the lever 23.

An actuator 35 is attached to the free end of the lever 12. As shown, this actuator is a weight, which is sufficient to operate the lever 12 downwardly and thereby rotate the ratchet wheel 11 in a direction to wind the spring 5 in the manner described, whenever said lever 12 is raised and said spring is tensioned or wound below a predetermined minimum.

The lever 23 occupies an inclined position, so that the weight of the parts 28, 29, 30, 31, 32, 33 and 34 at the upper end of said lever is utilized as an actuator to actuate said lever to a position and to an extent in which the member 25 is spaced from the ends of the cores or armatures 20. So long as the wire 27 is out of electrical communication with the frame of the clock, the electro-magnet 19 will not be energized. The means for placing the wire 27 in electrical communication with the frame of the clock and thus closing the circuit and energizing the electro-magnet 19 is an important feature of the present invention.

The relationship of the parts is such that when the weight 35 is seated upon its supporting rest 36, the pin 14 is in contact with the contact member 34. Thus, whenever the lever 12 moves downwardly to the full extent that it may move, the electric circuit is automatically closed, the electro-magnet 19 is energized, the lever 23 is thereby operated by moving the lower end of said lever toward the cores or armatures 20 and moving the upper end of said lever in a direction and to an extent to raise the lever 12 from its lower position, shown in Fig. 5, to its upper position, shown in Figs. 1, 3 and 6. The pin 14 is utilized as a crank against which the contact member 34 presses and operates as required to raise the free end of the lever 12. This action of the lever 23 whenever the electro-magnet 19 is energized is sudden, so that a quick impulse is imparted to the combined crank and contact pin 14 sufficient to throw said contact pin considerably beyond and out of contact therewith and substantially to the position shown in Fig. 3. This breaks the electric circuit and permits the lever 12 to move downwardly as the spring 5 unwinds until said lever again moves the pin 14 into contact with the member 34, whereupon the operation is repeated.

My invention comprises means limiting the extent to which the spring 5 may unwind and also limiting the extent to which said spring may be wound up. The means for thus limiting and controlling the extent of winding and unwinding the spring comprises a species of Geneva gear, the elements of which are cooperatively combined and associated with my invention in a novel manner to obtain this desirable result.

The Geneva gear mechanism mentioned comprises a disc member 37 attached to the shaft 2 by a pin 38 (Fig. 7) for rotating the member 37 by the shaft 2 and preventing said shaft and said member from rotating independently of each other. The periphery of the disc member 37 is formed with a pair of spaced notches 39 between which the tooth 40 projects from said member 37.

Figure 7:
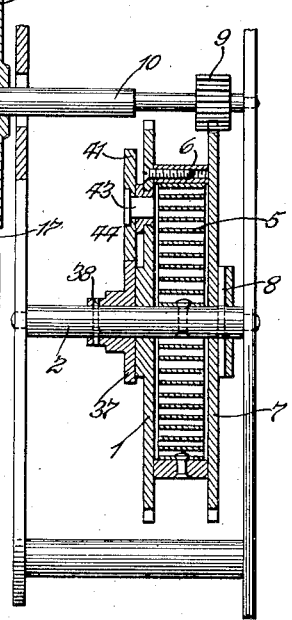
Fig. 7 is an enlarged sectional view similar to Fig. 4 and showing features of the invention omitted from Fig. 4.

The cooperating member 41 has an arcuate peripheral surface 42 which is concentric with the axis of a pivot pin 43 on which said member 41 is pivotally mounted. The pivot pin 43 is mounted in a plug 44 attached to the gear wheel 1 (Fig. 7). The radius of curvature of the arcuate edge 42 of the member 41 is longer than the distance from the axis of the pivot 43 to the curved periphery of the disc 37. Diametrically opposed notches 45 having curved walls are formed in the edge of the member 41, the radius of curvature of the walls of the notches 45 being the same as the radius of curvature of the periphery of the disc 37, so that either of said notches 45 will fit against the periphery of the disc 37 when said disc 37 and said member 41 are in positions for such contact. The member 41 has a pair of spaced notches 46 between which is an arm 47 having in its outer edge a notch 48 provided with a curved wall formed on a radius of curvature having the same length as the radius of curvature of the periphery of the member 37. Accordingly, the walls of both notches 45 and the notch 48 are formed on radii of curvature of the same length and the length of said radii of curvature is equal to the length of the radius of curvature of the disc 37. This permits the disc 37 to continue to rotate when its periphery is engaged in either of the notches 45 or in the notch 48 and until the tooth 40 engages the arcuate portion 42.

Figure 6:
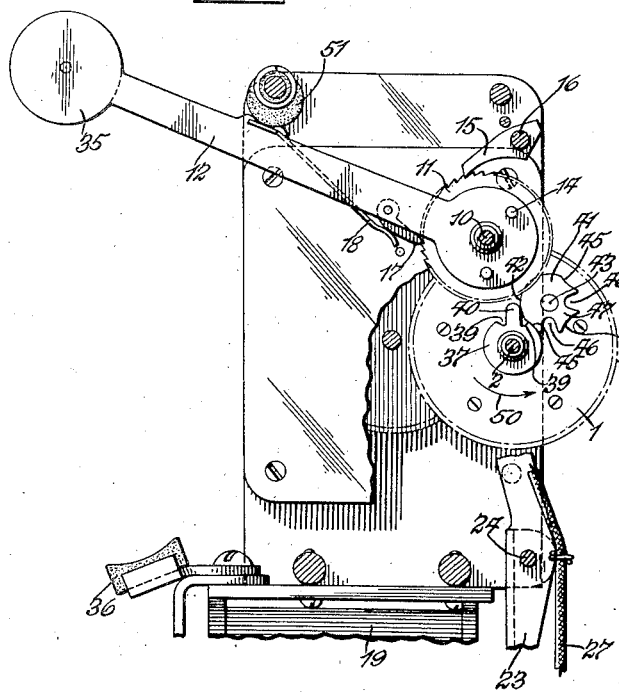
Fig. 6 is a view similar to Fig. 5 showing the clock mechanism in the position it occupies when the spring is completely wound up.

In the position shown in Fig. 5, the spring 5 is run down. To wind the spring 5 while the gear wheel 1 is held against rotation, the shaft 2 is rotated in the direction of the arrow 49. During the first revolution of the shaft 2 in the direction of the arrow 49, the tooth 40 enters the adjacent notch 46, thus turning the member 41 to position in which the notch 48 is against the periphery of the disc 37. During the second revolution of the shaft 2, the tooth 40 enters the other notch 46 and thereby turns the member 41 to position in which the second notch 45 engages the periphery of the disc 37. During the third revolution of the shaft 2, the tooth 40 turns around from the adjacent notch 46 to position in which said tooth 40 engages the arcuate edge 42 (Fig. 6), thus positively stopping further rotation of the shaft 2. The shaft 2 is thus locked against further rotation to wind the spring 5 because the tooth 40 is against the periphery of the member 41, which is supported on the wheel 1 and said wheel 1 cannot be turned by the spring 5 in the direction of the arrow 49 (Fig. 5). On the contrary, the spring 5 is utilized to turn the gear wheel 1 in the direction of the arrow 50 (Fig. 6). If the electric current is interrupted so that the electro-magnet 19 is not energized, the rewinding lever 12 will not be operated. However, sufficient energy is stored up in the spring 5 to rotate the gear wheel 1 approximately three revolutions in the direction of the arrow 50, which is sufficient to operate the clock for a considerable period of time determined upon the ratio of the gearing. In any case, the ratio of the gearing should be sufficient to permit three rotations of the gear 1 to operate the clock for at least twenty-four hours, more or less, and this period of operation may be increased by changing the ratio of gearing.

As shown, extent of downward operation of the lever 12 is limited by the supporting rest 36 and extent of upward movement of said lever is limited by a yielding abutment 51.

As shown in Fig. 3, the lever 23 is supported in its idle or unoperated position by a spring 52 on said lever engaging a stationary support 53 supported by the clock frame. The lever 23 will remain in the position shown in Fig. 3 until the contact pin 14 is moved into contact with the contact member 34 to close the circuit through the electro-magnet. This occurs about the time the part 35 engages the support 36. Immediately upon the closing of the circuit in this way, the electro-magnet 19 is energized, the lever 23 is operated and the pin 14 and its relationship to the lever 12 are utilized as a crank device to raise the lever 12 to its upper position against the yielding abutment 51. As before stated, the operation of the lever 23 is quick and sudden, so that the pin 14 is thrown beyond and out of contact with the contact member 34, thus breaking the circuit and permitting the spring 26 to move the member 25 immediately out of contact with the core or armature member 20. This also moves the upper end of the lever 23 to its unoperated position in which the spring 52 engages the abutment 53. The pawl 17 is constantly engaged with the ratchet wheel 11. The actuator device 35—12 moves downwardly until the spring 5 is wound to the predetermined tension or until the contact pin 14 is engaged with the contact member 34. If the spring 5 is wound to such an extent that the actuator device 12—35 cannot move all the way down at one winding operation, the spring 5 will continue to operate the gear wheel 1 and to unwind in the natural operation of the clock, thus permitting the lever 12 to descend slowly and in accordance with the operation of the clock mechanism by the spring 5 until the contact member 14 is engaged with the contact member 34. Then the actuator lever 12 is again quickly raised and the operation is repeated.

It is now clear that my invention comprises a lever for operating a train of gearing to wind the spring 5; that the movement of said lever in one direction is controlled and permitted by the unwinding of said spring; that the movement of said lever in said one direction to a predetermined position controls the energizing of the actuator 19 and consequent operation of the lever 23 to move the lever 12 to a position in which it will operate the train of gearing to rewind the spring; and that the cooperation of the lever 12 and the lever 23 effects a closing of the electric circuit to energize the actuator 19. Further, it is clear that by this embodiment of means the invention comprises a simplified mechanism for maintaining the spring 5 approximately at uniform tension and for storing up energy in said spring sufficient to operate the clock for a considerable period of time even though the lever 23 remains unoperated as a consequence of the interruption of the supply of electrical energy thereto, such as the break down of the electric power. Consequently the invention obtains all of its intended objects and purposes in a highly efficient and satisfactory manner and may be widely varied within the scope of equivalent limits without departure from the nature and principle thereof. I do not restrict myself in any unessential respects, but what I claim and desire to secure by Letters Patent is:

1. In a clock, a gear to be rotated, a shaft supporting said gear, a spring connecting said shaft and said gear for rotating said gear about said shaft, a train of gearing for rotating said shaft to wind said spring, a lever for operating said gearing, a second lever for moving said first lever to position to operate said gearing, gear mechanism mounted on said shaft and said gear limiting extent of winding of said spring, means supported by said two levers for controlling operation of said second lever and for moving said first lever to said position, and mechanism for operating said second lever.

2. In a clock, a gear to be rotated, a shaft supporting said gear, a spring for rotating said gear about said shaft, a train of gearing for winding said spring, a lever for operating said train of gearing, a second lever for moving said first lever to position to operate said train of gearing, gear mechanism mounted on said shaft and said gear limiting extent of winding of said spring, parts supported by said two levers for controlling operation of said second lever by said first lever and for moving said first lever to said position, and mechanism controlled by said parts for operating said second lever.

3. In a clock, a gear to be rotated, connections for rotating said gear, a lever for operating said connections, a second lever for moving said first lever to position to operate said connections, an electric circuit wire, a contact member supported by and insulated from said second lever and connected with said circuit wire, a part connected with said first lever and movable thereby into contact with said contact member to place said contact member in electrical communication with said first lever, and electric mechanism for operating said second lever when said part contacts with said contact member as aforesaid and causing said second lever to move said first lever to position to operate said connections and to move said part out of contact with said contact member.

ARNO W. FOWLER.